United States Patent
Lee

(10) Patent No.: US 7,217,096 B2
(45) Date of Patent: May 15, 2007

(54) FILLET ENERGIZED TURBINE STAGE

(75) Inventor: Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/010,688

(22) Filed: Dec. 13, 2004

(65) Prior Publication Data

US 2006/0127220 A1   Jun. 15, 2006

(51) Int. Cl.
*F01D 5/08* (2006.01)

(52) U.S. Cl. .................. 416/97 R; 416/223 A

(58) Field of Classification Search ................ 415/115, 415/914; 416/96 R, 97 R, 193 A, 223 A, 416/248
See application file for complete search history.

(56) References Cited

U.S. PATENT DOCUMENTS

| | | | |
|---|---|---|---|
| 4,194,869 A | 3/1980 | Corcokios | |
| 4,778,338 A | 10/1988 | Bessay | |
| 4,832,567 A | 5/1989 | Bessay | |
| 5,340,278 A | 8/1994 | Magowan | |
| 5,382,135 A | 1/1995 | Green | |
| 5,397,215 A | 3/1995 | Spear et al. | |
| 6,017,186 A * | 1/2000 | Hoeger et al. | 415/181 |
| 6,190,128 B1 | 2/2001 | Fukuno et al. | |
| 6,283,713 B1 | 9/2001 | Harvey et al. | |
| 6,325,593 B1 | 12/2001 | Darkins et al. | |
| 6,338,609 B1 | 1/2002 | Decker et al. | |
| 6,341,939 B1 * | 1/2002 | Lee | 416/97 R |
| 6,354,797 B1 | 3/2002 | Heyward et al. | |
| 6,419,446 B1 | 7/2002 | Kvasnak et al. | |
| 6,478,545 B2 | 11/2002 | Crall et al. | |
| 6,511,294 B1 | 1/2003 | Meilke et al. | |
| 6,561,761 B1 | 5/2003 | Decker et al. | |
| 6,669,445 B2 | 12/2003 | Staubach et al. | |
| 6,719,529 B2 * | 4/2004 | Tiemann | 416/97 R |
| 6,830,432 B1 * | 12/2004 | Scott et al. | 416/97 R |

(Continued)

FOREIGN PATENT DOCUMENTS

CH    229266    1/1944

(Continued)

OTHER PUBLICATIONS

Harvey et al, "Non-Asxisymmetric Turbine End Wall Design: Part 1 Three Dimensional Linear Design System," ASME 99-GT-337, Jun. 1999, pp: 1-9.

(Continued)

*Primary Examiner*—Edward K. Look
*Assistant Examiner*—Devin Hanan
(74) *Attorney, Agent, or Firm*—William S. Andes; Francis L. Conte

(57) ABSTRACT

A turbine stage includes a row of airfoils and their platforms spaced laterally apart to define flow passages therebetween. Each airfoil is integrally joined to its platform at a corresponding arcuate fillet which is larger along the pressure side of the airfoil and smaller along the suction side as it varies in size around the leading edge. A film cooling root hole is disposed in the root fillet in flow communication with an internal cooling circuit in the airfoil for discharging cooling air along the fillet for energizing boundary layer flow of combustion gases flowing through the flow passages during operation.

26 Claims, 3 Drawing Sheets

U.S. PATENT DOCUMENTS

| | | |
|---|---|---|
| 6,837,679 B2 | 1/2005 | Kawarada et al. |
| 6,884,029 B2 * | 4/2005 | Beeck ........................ 415/191 |
| 6,969,232 B2 | 11/2005 | Zess et al. |
| 2002/0127108 A1 | 9/2002 | Crall et al. |
| 2004/0081548 A1 | 4/2004 | Zess et al. |

FOREIGN PATENT DOCUMENTS

| | | |
|---|---|---|
| FR | 1602965 | 4/1971 |
| GB | 2253443 A | 9/1992 |
| JP | 58-32903 | 2/1983 |
| WO | WO 96/00841 | 1/1996 |
| WO | WO 00/61918 | 10/2000 |

OTHER PUBLICATIONS

Patent Abstract of Japan, vol. 007, No. 112 (M-215), May 17, 1983, European Patent Office, publication No. 58032903, pub. Date Feb. 26, 1983, single page.

* cited by examiner

FILLET ENERGIZED TURBINE STAGE

BACKGROUND OF THE INVENTION

The present invention relates generally to gas turbine engines, and, more specifically, to turbines therein.

In a gas turbine engine air is pressurized in a compressor and mixed with fuel in a combustor for generating hot combustion gases. Turbine stages extract energy from the combustion gases to power the compressor, while also powering an upstream fan in a turbofan aircraft engine application, or powering an external drive shaft for marine and industrial applications.

A high pressure turbine (HPT) immediately follows the combustor and includes a stationary turbine nozzle which discharges combustion gases into a row of rotating first stage turbine rotor blades extending radially outwardly from a supporting rotor disk. The HPT may include one or more stages of rotor blades and corresponding turbine nozzles.

Following the HPT is a low pressure turbine (LPT) which typically includes multiple stages of rotor blades and corresponding turbine nozzles.

Each turbine nozzle includes a row of stator vanes having radially outer and inner endwalls in the form of arcuate bands which support the vanes. Correspondingly, the turbine rotor blades include airfoils integrally joined to radially inner endwalls or platforms supported in turn by corresponding dovetails which mount the individual blades in dovetail slots formed in the perimeter of the supporting rotor disk. An annular shroud surrounds the radially outer tips of the rotor airfoils in each turbine stage.

The stator vanes and rotor blades have corresponding airfoils including generally concave pressure sides and generally convex suction sides extending axially in chord between opposite leading and trailing edges. Adjacent vanes and adjacent blades form corresponding flow passages therebetween bound by the radially inner and outer endwalls.

During operation, the combustion gases are discharged from the combustor and flow axially downstream through the respective flow passages defined between the stator vanes and rotor blades. The aerodynamic contours of the vanes and blades, and corresponding flow passages therebetween, are precisely configured for maximizing energy extraction from the combustion gases which in turn rotate the rotor from which the blades extend.

The complex three-dimensional (3D) configuration of the vane and blade airfoils is tailored for maximizing efficiency of operation, and varies radially in span along the airfoils as well as axially along the chords of the airfoils between the leading and trailing edges. Accordingly, the velocity and pressure distributions of the combustion gases over the airfoil surfaces as well as within the corresponding flow passages also vary.

Undesirable pressure losses in the combustion gas flowpaths therefore correspond with undesirable reduction in overall turbine efficiency. For example, the combustion gases enter the corresponding rows of vanes and blades in the flow passages therebetween and are necessarily split at the respective leading edges of the airfoils.

The locus of stagnation points of the incident combustion gases extends along the leading edge of each airfoil, and corresponding boundary layers are formed along the pressure and suction sides of each airfoil, as well as along each radially outer and inner endwall which collectively bound the four sides of each flow passage. In the boundary layers, the local velocity of the combustion gases varies from zero along the endwalls and airfoil surfaces to the unrestrained velocity in the combustion gases where the boundary layers terminate.

One common source of turbine pressure losses is the formation of horseshoe vortices generated as the combustion gases are split in their travel around the airfoil leading edges. A total pressure gradient is effected in the boundary layer flow at the junction of the leading edge and endwalls of the airfoil. This pressure gradient at the airfoil leading edges forms a pair of counterrotating horseshoe vortices which travel downstream on the opposite sides of each airfoil near the endwall.

The two vortices travel aft along the opposite pressure and suction sides of each airfoil and behave differently due to the different pressure and velocity distributions therealong. For example, computational analysis indicates that the suction side vortex migrates away from the endwall toward the airfoil trailing edge and then interacts following the airfoil trailing edge with the pressure side vortex flowing aft thereto.

The interaction of the pressure and suction side vortices occurs near the midspan region of the airfoils and creates total pressure loss and a corresponding reduction in turbine efficiency. These vortices also create turbulence and increase undesirable heating of the endwalls.

Since the horseshoe vortices are formed at the junctions of turbine rotor blades and their integral root platforms, as well at the junctions of nozzle stator vanes and their outer and inner bands, corresponding losses in turbine efficiency are created, as well as additional heating of the corresponding endwall components.

Accordingly, it is desired to provide an improved turbine stage for reducing horseshoe vortex affects.

BRIEF DESCRIPTION OF THE INVENTION

A turbine stage includes a row of airfoils and their platforms spaced laterally apart to define flow passages therebetween. Each airfoil is integrally joined to its platform at a corresponding arcuate fillet which is larger along the pressure side of the airfoil and smaller along the suction side as it varies in size around the leading edge. A film cooling root hole is disposed in the root fillet in flow communication with an internal cooling circuit in the airfoil for discharging cooling air along the fillet for energizing boundary layer flow of combustion gases flowing through the flow passages during operation.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
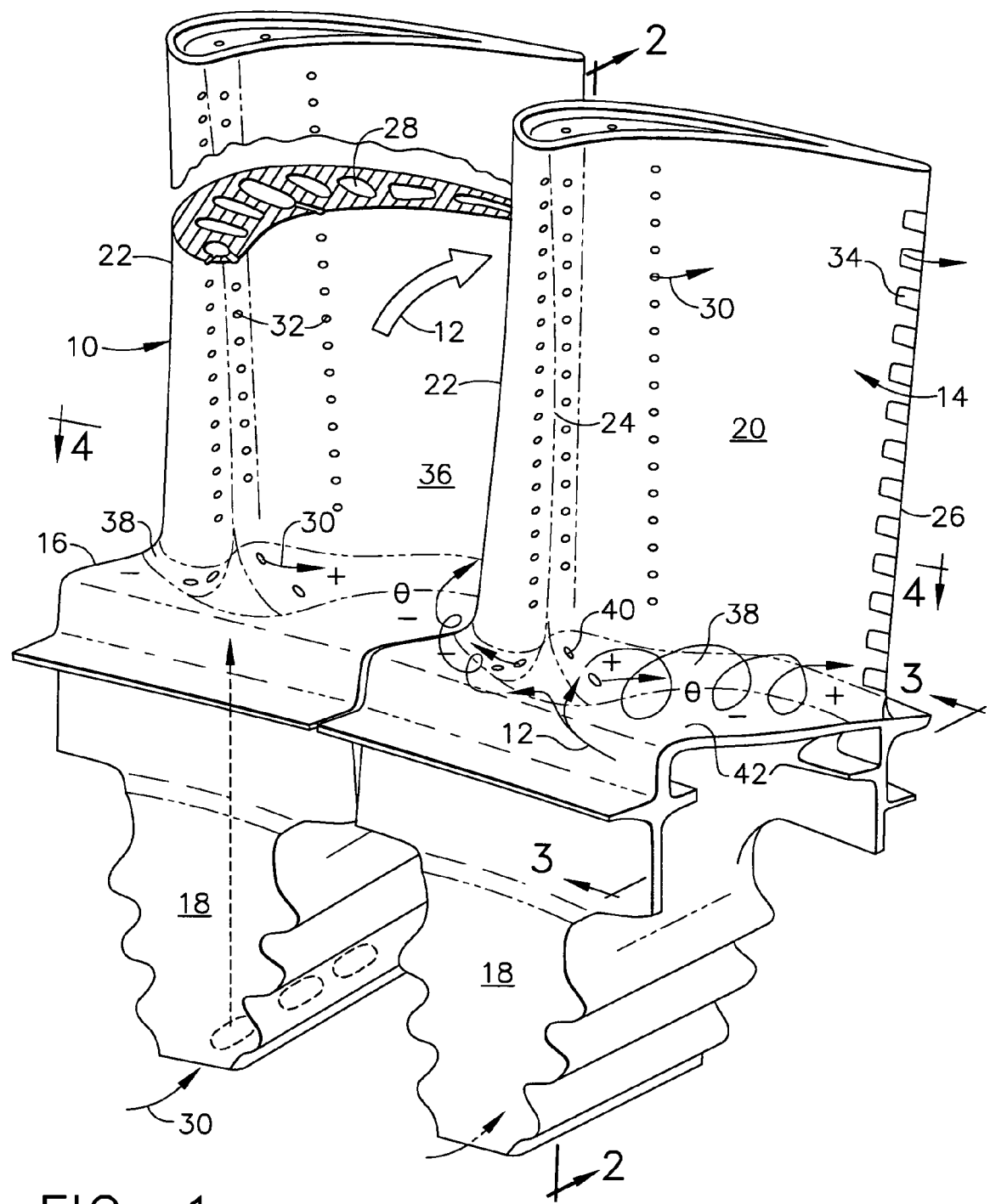
FIG. 1 is an isometric view of two adjacent rotor blades in the first stage of a high pressure turbine.

Illustrated in FIG. 1 are two exemplary first stage turbine rotor blades 10 which circumferentially adjoin each other in a full row thereof in a corresponding turbine stage of a gas turbine engine. As indicated above, combustion gases 12 are formed in a conventional combustor (not shown) and discharged in the axial downstream direction through the row of turbine blades 10 which extract energy therefrom for powering a supporting rotor disk (not shown) on which the blades are mounted.

The turbine stage includes a complete row of the blades, with each blade having a corresponding airfoil 14 integrally joined at a root end to a corresponding radially inner endwall or platform 16. Each platform is in turn integrally joined to a corresponding axial-entry dovetail 18 conventionally configured for supporting the corresponding turbine blade in the perimeter of the rotor disk.

Each airfoil includes a generally concave pressure side 20 and a circumferentially or laterally opposite, generally convex suction side 22 extending axially in chord between opposite leading and trailing edges 24,26. The two edges extend radially in span from root to tip of the airfoil.

Figure 2:
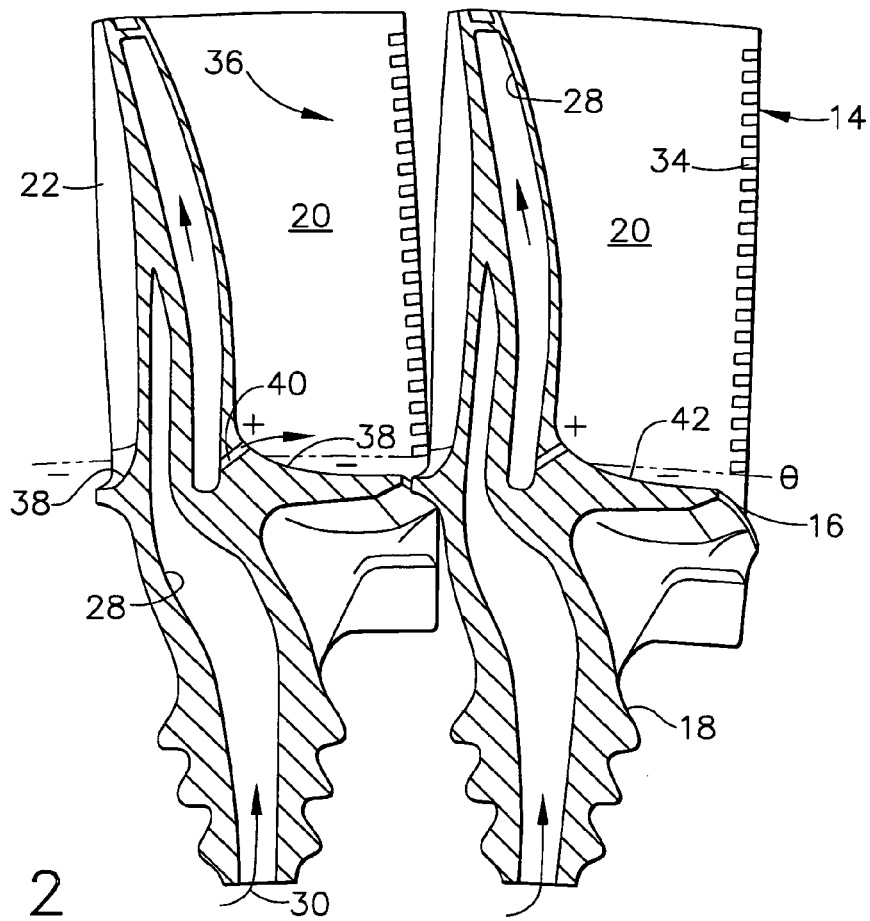
FIG. 2 is an elevational sectional view through the turbine blades illustrated in FIG. 1 and taken along line 2-2.

As shown in FIGS. 1 and 2, each airfoil is hollow and includes an internal cooling circuit 28 bound by the opposite pressure and suction sides. The cooling circuit may have any conventional configuration and includes inlet channels extending through the platform and dovetail for receiving cooling air 30 bled from the compressor of the engine (not shown).

The cooling air is typically discharged from each airfoil through several rows of film cooling holes 32 located where desired on the pressure and suction sides of the airfoil, and typically concentrated near the leading edge thereof. Each airfoil typically also includes a row of trailing edge cooling holes 34 which emerge through the pressure side of the airfoil just before the thin trailing edge thereof.

The exemplary turbine blades illustrated in FIGS. 1 and 2 may have any conventional configuration of the airfoil, platform, and dovetail for extracting energy from the combustion gases 12 during operation. As indicated above, the platform 16 is integrally joined to the root end of the airfoil and defines the radially inner flow boundary for the combustion gases 12.

The blades are mounted in a row around the perimeter of the rotor disk, with the adjacent airfoils 14 being spaced circumferentially or laterally apart to define therebetween flow passages 36 for channeling the combustion gases 12 axially in the downstream direction during operation.

Each inter-airfoil flow passage 36 in the turbine stage illustrated in FIGS. 1 and 2 is therefore defined and bounded by the pressure side 20 of one airfoil, the suction side 22 of the next adjacent airfoil, the corresponding pressure and suction side portions of the adjacent platforms 16, and the radially outer turbine shroud (not shown) which surrounds the radially outer tip ends of the airfoils in the complete row of turbine blades.

As indicated above in the Background section, the combustion gases 12 flow through the corresponding flow passages 36 during operation and are necessarily split by the individual airfoils 14. The high velocity combustion gases are circumferentially split at the corresponding airfoil leading edges 24 with a stagnation pressure threat, and with the formation of corresponding boundary layers along the opposite pressure and suction sides of the airfoil.

Furthermore, the combustion gases also form a boundary layer along the individual blade platforms 16 as the gases are split around the airfoil leading edge at its juncture with the platform.

Accordingly, the split combustion gas flow along the blade platforms results in a pair of counterrotating horseshoe vortices which flow axially downstream through the flow passages along the opposite pressure and suction sides of each airfoil. These horseshoe vortices create turbulence in the boundary layers, and migrate radially outwardly toward the mid-span regions of the airfoils and create losses of total pressure and reduce turbine efficiency.

In order to reduce these adverse affects of the horseshoe vortices, each platform 16 is integrally joined to the root end of each airfoil at a relatively large arcuate fillet 38 specifically configured to change the contour of the endwall or platform 16 to improve aerodynamic efficiency. Since the pressure and suction sides of the airfoil are differently configured for effecting the corresponding pressure and velocity distributions thereover, the fillet 38 preferably varies in size and configuration along the opposite sides of each airfoil. For example, the fillet 38 is larger along the airfoil pressure side 20 than along the suction side 22 around the leading edge 24, and changes or blends smaller in size around the leading edge.

Furthermore, each of the fillets 38 includes a film cooling root or fillet hole 40 joined in flow communication with the internal cooling circuit 28 for discharging a portion of the spent cooling air 30 along the fillet during operation. The air discharged from the root hole 40 is used to energize the boundary layer flow of the combustion gases 12 at the initiation of the horseshoe vortices, and therefore weakens those vortices as they travel downstream through the corresponding flow passages 36. The configuration of the root fillet 38 and placement of the root holes 40 may be tailored specifically to decrease the adverse affects of the horseshoe vortices beginning at their inception at the airfoil leading edges.

Figure 3:
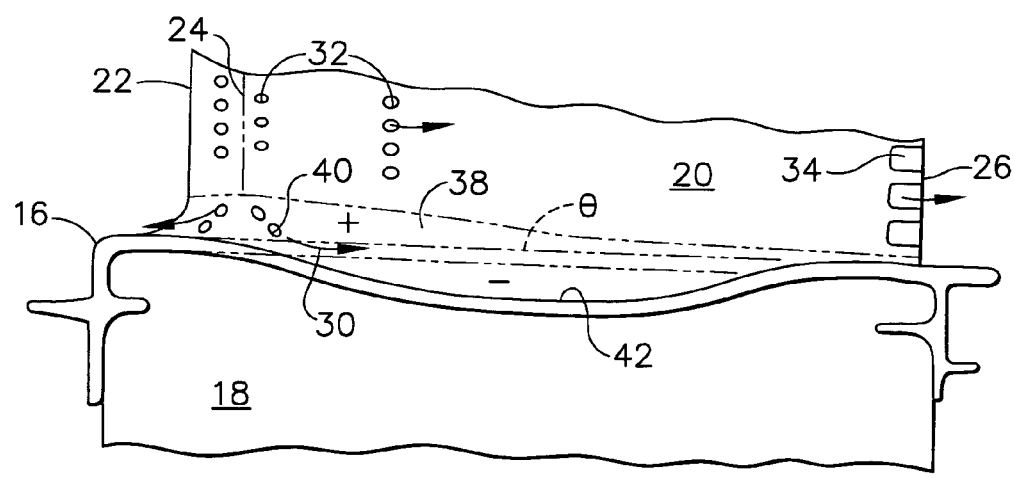
FIG. 3 is an enlarged side elevational view of the platform region at the root of the airfoil pressure side of one of the blades illustrated in FIG. 1 and taken along line 3—3.

FIGS. 1–3 illustrate several views of the root fillet 38 which preferentially varies in size from the leading edge 24 to the trailing edge 26 of the airfoil along the opposite pressure and suction sides 20,22 thereof. As best shown in FIG. 2, the fillet 38 extends from the platform 16 greater or higher in radial span or elevation (+) on the pressure side 20 than on the suction side 22 near the leading edge 24.

The fillet 38 may be defined by its radius of curvature in the circumferential direction and smoothly blends the junction of the root end of the airfoil with the platform in an arcuate profile. The fillet 38 is substantially larger in size or extent on the airfoil pressure side than on the suction side to correspond with the different pressure and velocity profiles of the combustion gases on the opposite sides of the airfoil.

Figure 4:
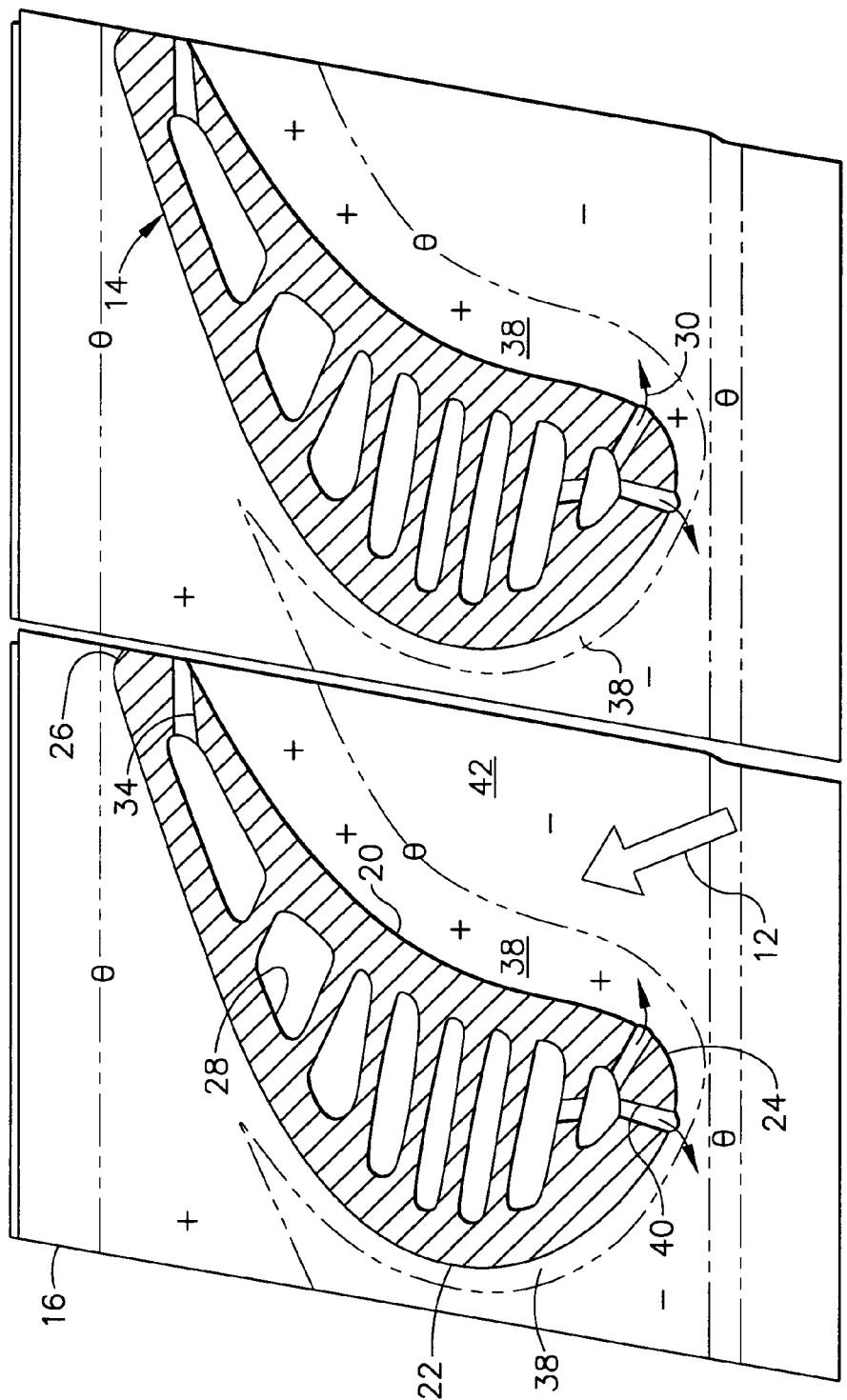
FIG. 4 is a partly sectional planiform view of the two blades illustrated in FIG. 1 and taken along line 4—4.

FIG. 2 illustrates a circumferential section of the fillet 38. FIG. 3 illustrate the axial profile of the fillet 38 on the pressure side 20 of the airfoil. And, FIG. 4 is a top view of the fillet 38 schematically showing its variation in size and surface area in the platform 16 on the opposite sides of the individual airfoils 14.

A conventional blade platform is a symmetrical surface revolution around the axial centerline axis of the engine or turbine rotor forming circular arcs. In contrast, the root fillets 38 illustrated in FIGS. 2–4 blend with the outer surface of the platforms 16 and vary the surface contour thereof both circumferentially and axially.

For example, each fillet 38 blends in depth (−) in a local depression 42 in the exposed or outer surface of the platform 16 which depression is substantially larger on the pressure side 20 of the airfoil than on the suction side. The local depression illustrated in FIGS. 2–4 is relative to an otherwise conventional circumferentially circular platform having a reference or zero (θ) radial elevation.

Furthermore, since the introduction of the large fillets 38 and depressions 42 are local effects, the radial extent thereof may also be referenced from the forward and aft portions or edges of the flow platform which may remain axisymmetrical in the form of conventional circular arcs without local variation.

As shown in FIG. 2, for example, the fillet 38 increases preferably continuously in depth from the pressure side 20 of the airfoil to the platform 16 on the suction side of the next adjacent airfoil just aft of the leading edge of the airfoil near the maximum thickness or hump region thereof as best illustrated in FIG. 4.

As shown in FIGS. 3 and 4, the platform depression 42 is bounded by the isocline of zero depth (θ) and extends both axially in part and circumferentially in part, and terminates axially near the airfoil leading and trailing edges 24,26 corresponding with the forward and aft edges of the individual platform 16. The local depression 42 has a maximum depth in the platform axially between the leading and trailing edges of the airfoil in the midchord region of the airfoil, and along the lateral or circumferential edges or splitlines of the individual platforms where they adjoin each other in the row of blades.

In the exemplary embodiment illustrated in FIG. 2, the local depressions 42 and bounding fillets 38 of adjacent airfoils 14 define a concave arcuate profile in the circumferential direction bounding the radially inner end of the common flow passage 36 defined circumferentially therebetween. Each turbine blade therefore has a fillet 38 and local depression 42 on its pressure side 20 which has a laterally concave arcuate profile, and a similar arcuate profile for the fillet and local depression on the opposite suction side 22, which are different in extent or surface area due to the twist angle of the airfoil extending diagonally across each of the quadrilateral platforms illustrated in FIG. 4.

As best shown in FIGS. 2 and 4, the fillet 38 and depression 42 along the airfoil pressure side 20 are therefore circumferentially longer than the fillet 38 and depression along the suction side 22 of the adjacent airfoil. Correspondingly, the local depression 42 in the platform of each blade is larger in surface area on the pressure side 20 than on the opposite suction side 22.

Since the horseshoe vortices are initiated at the forward end of the individual blade platforms at the junction with the leading edge 24, the relatively large root fillets 38 and the cooperating local depressions 42 are specifically tailored in this region for weakening the vortices in conjunction with the introduction of the film cooling air from the root holes 40.

FIGS. 1 and 4 illustrate the varying size of the fillet 38 as it decreases in size around the leading edge 24 from the pressure side 20 to the suction side 22. FIGS. 2 and 3 illustrate the depth (−) of the local depression 42 as it blends with the fillet 38. These figures also illustrate the increased elevation (+) of the fillet 38 as it blends with the root end of the airfoil.

FIG. 4 illustrates the exemplary elevation (+) and depression (−) of the fillet 38 and the depressions 42 as they vary in surface area and radial span or elevation between the leading and trailing edges of each airfoil and each platform.

The fillet 38 as illustrated in FIGS. 1 and 4 experiences a large change in size around the leading edge 24 and gradually blends to the trailing edge of each airfoil along the opposite sides of the platform. The platform, in turn, varies in surface depth to match the fillet 38 and blends with the forward and aft edges of the platform as illustrated in FIG. 3, with a maximum depth axially therebetween.

The relative size of the fillets 38 and local depressions 42 will vary in accordance with the specific design of the turbine stage, including the specific profile of the individual airfoils and their relative twist angle as mounted on the individual platform 16. However, since the horseshoe vortices begin at the airfoil leading edge, the introduction of the large fillet 38 around the junction of the leading edge with the platform may be used to advantage with the root holes 40 for significantly weakening the horseshoe vortices during operation.

Although a single root hole 40 could be used in the fillet 38 on either or both sides of the leading edge 24, in the preferred embodiment illustrated in FIG. 3 a plurality of the root holes 40 border each of the leading edges 24 on the pressure and suction sides 20,22 for energizing the boundary layers at each of the horseshoe vortices. Each root hole may have a diameter in the exemplary range of 15–50 mils for injecting sufficient air into the fillet 38 to weaken in turn the horseshoe vortices.

For example, FIG. 3 illustrates a preferred embodiment in which a pair of root holes 40 are located in each of the pressure and suction sides 20,22 of the airfoil on opposite sides of the leading edge 24 for injecting spent cooling air into the boundary layer of the combustion gas flow in the inter-blade flow passages.

Correspondingly, the fillets 38 are preferably devoid of any additional film cooling holes or apertures between the leading and trailing edges except near the leading edges 24 as indicated above. The fillets best cooperate with the introduction of air at the airfoil leading edges to weaken the horseshoe vortices at their inception since they increase in size and span as they travel downstream through the flow passages.

In the preferred embodiment illustrated in the several Figures, the root holes 40 are limited in axial position in chord aft from the leading edge 24 to within about five diameters of the root holes themselves to ensure the introduction of cooling air to energize the boundary layer at the inception of the horseshoe vortices.

The introduction of the large fillet around the airfoil leading edge blends the airfoil at its root with the platform and permits the introduction of the root holes 40 at this junction to preferentially inject spent cooling air to energize the boundary layer of the combustion gas flow at its inception along the blade platforms. The relatively large fillet 38 on the pressure side of the airfoil as illustrated in FIG. 2 gradually slopes downwardly in the circumferential direction toward the suction side of the next adjacent blade along the flow streamline of the combustion gases.

Accordingly, the pressure side horseshoe vortex combines with the injected film cooling air at the fillet 38 and travels downwardly toward the suction side of the next adjacent blade in the circumferential direction as it also flows downstream through the flow passage. The pressure side horseshoe vortex therefore is biased closer to the blade platform and reduces its tendency to migrate radially outwardly toward the midspan of the airfoil as it flows downstream through the flow passage.

As illustrated in FIG. 4, the local depressions 42 between adjacent airfoils smoothly blend with the aft edges of the platforms to control flow of the corresponding horseshoe vortices as they exit the flow passage.

The root fillets 38, local platform depressions 42, and root holes 40 cooperate to create smaller horseshoe vortices from their inception which in turn will generate less flow turbulence. The vortices will remain closer to the blade platform and reduce their affect on the main passage flow. Total pressure losses will therefore be reduced for correspondingly increasing turbine efficiency. Furthermore, by reducing turbulence of the horseshoe vortices, the heat transfer coefficient with the platforms will also be reduced for decreasing undesirable heating of the platforms themselves.

Accordingly, weakening the horseshoe vortices can significantly reduce pressure losses and surface heating on the platform. And, film cooling from the root holes will also carry over to the platform surface for further insulating the platform from the hot combustion gases. The local depressions in the platforms on opposite sides of the airfoils lower the radially upward migration of the passage vortices and maintain the total pressure losses closer to the platforms to better protect the high velocity combustion gas main flow through the flow passages.

The introduction of the root fillets 38, local depressions 42, and root holes 40 provide benefits in both aerodynamics and heat transfer and may be applied to other turbine stages, including turbine nozzles as well. In a turbine nozzle, the vane airfoils are integrally formed with radially outer and inner bands which define similar endwalls. The fillets, local depressions, and root holes may be advantageously introduced at both endwalls of each vane for weakening the corresponding horseshoe vortices as they are created.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A turbine stage comprising:
   a row of airfoils integrally joined to corresponding platforms and spaced laterally apart to define respective flow passages therebetween for channeling combustion gases;
   each of said airfoils including a concave pressure side and a laterally opposite convex suction side bounding an internal cooling circuit, and extending in chord between opposite leading and trailing edges;
   each of said airfoils blending with said platforms in an arcuate fillet being larger in size along said pressure side than along said suction side around said leading edge, and forming a local depression in said platform being larger on said pressure side than on said suction side; and
   each of said fillets including a film cooling root hole joined in flow communication with said cooling circuit for discharging cooling air along said fillet for energizing boundary layer flow of said combustion gases and weakening horseshoe vortices in said flow passages.

2. A turbine stage according to claim 1 wherein said fillet varies in radius between said leading and trailing edges, and extends from said platform greater in span on said pressure side than on suction side near said leading edge.

3. A turbine stage according to claim 2 wherein said fillet on said airfoil pressure side increases in depth in said depression to the platform on the suction side of an adjacent airfoil.

4. A turbine stage according to claim 3 wherein said platform depression terminates near said airfoil leading and trailing edges.

5. A turbine stage according to claim 4 wherein said fillet and depressions in said platform on said pressure and suction sides of said airfoil have laterally concave arcuate profiles.

6. A turbine stage according to claim 5 wherein said fillet and depression along said airfoil pressure side are circumferentially longer than said fillet and depression along said suction side.

7. A turbine stage according to claim 6 further comprising a plurality of said root holes bordering each of said leading edges on said pressure and suction sides.

8. A turbine stage according to claim 6 further comprising a pair of said root holes in each of said pressure and suction sides of each of said airfoils adjacent said leading edges thereof.

9. A turbine stage according to claim 6 wherein said fillets are devoid of apertures except near said leading edges.

10. A turbinestage according to claim 6 wherein said root hole is disposed within about five diameters in chord from said leading edge.

11. A turbine stage comprising:
    a row of airfoils integrally joined to corresponding platforms and spaced laterally apart to define respective flow passages therebetween for channeling combustion gases;
    each of said airfoils including a concave pressure side and a laterally opposite convex suction side bounding an internal cooling circuit, and extending in chord between opposite leading and trailing edges;
    said airfoils being joined to said platforms at corresponding arcuate fillets being larger along said pressure side and decreasing smaller in size around said leading edge to said suction side; and
    each of said fillets including a film cooling root hole joined in flow communication with said cooling circuit for discharging cooling air along said fillet for energizing boundary layer flow of said combustion gases and weakening horseshoe vortices in said flow passages.

12. A turbine stage according to claim 11 wherein said fillet varies in size from said leading edge to said trailing edge, and extends from said platform greater in span on said pressure side than on suction side near said leading edge.

13. A turbine stage according to claim 12 wherein said fillet blends in depth in a depression in said platform on said airfoil pressure side with said depth increasing to the platform on the suction side of an adjacent airfoil.

14. A turbine stage according to claim 13 wherein said platform depression terminates near said airfoil leading and trailing edges.

15. A turbine stage according to claim 13 wherein said depressions and fillets of adjacent airfoils define a concave arcuate profile bounding one end of said flow passage therebetween.

16. A turbine stage according to claim 13 wherein said fillet and depression along said airfoil pressure side are circumferentially longer than said fillet and depression along said suction side of an adjacent airfoil.

17. A turbine stage according to claim 13 further comprising a plurality of said root holes bordering each of said leading edges on said pressure and suction sides.

18. A turbine stage according to claim 13 further comprising a pair of said root holes in each of said pressure and suction sides of each of said airfoils adjacent said leading edges thereof.

19. A turbine stage according to claim 13 wherein said fillets are devoid of apertures except near said leading edges.

20. A turbine stage according to claim 13 wherein said root holes are disposed within about five diameters thereof in chord from said leading edge.

21. A turbine blade comprising:
an airfoil including a concave pressure side and a laterally opposite convex suction side bounding an internal cooling circuit, and extending in chord between opposite leading and trailing edges;
a platform integrally joined to a root end of said airfoil at an arcuate fillet being larger along said pressure side and decreasing smaller in size around said leading edge to said suction side; and
a film cooling root hole extending through said fillet adjacent said leading edge, and disposed in flow communication with said cooling circuit for discharging cooling air along said fillet for energizing boundary layer flow of combustion gases channeled around said airfoil to weaken horseshoe vortices therein.

22. A blade according to claim 21 wherein said fillet:
varies in size between said leading and trailing edges;
extends from said platform greater in elevation on said pressure side than on said suction side; and
blends laterally in depth in a local depression in said platform on said airfoil pressure side.

23. A blade according to claim 22 wherein said depression terminates near said leading and trailing edges, and has a maximum depth axially therebetween along lateral edges of said platform.

24. A blade according to claim 23 further comprising a plurality of root holes bordering said leading edge on said pressure and suction sides.

25. A blade according to claim 24 wherein said fillet is devoid of apertures except near said leading edge.

26. A blade according to claim 24 wherein said root holes are disposed within about five diameters in chord from said leading edge.

* * * * *